(12) United States Patent
Liao et al.

(10) Patent No.: US 8,625,956 B2
(45) Date of Patent: Jan. 7, 2014

(54) IMAGING/REPRODUCING DEVICE

(75) Inventors: Baiping Liao, Saitama (JP); Ichiro Ueno, Saitama (JP)

(73) Assignee: Sony Corporation, Tokyo (JP)

( * ) Notice: Subject to any disclaimer, the term of this patent is extended or adjusted under 35 U.S.C. 154(b) by 1188 days.

(21) Appl. No.: 11/794,738

(22) PCT Filed: Nov. 7, 2006

(86) PCT No.: PCT/JP2006/022179
§ 371 (c)(1),
(2), (4) Date: Jul. 5, 2007

(87) PCT Pub. No.: WO2007/055205
PCT Pub. Date: May 18, 2007

(65) Prior Publication Data
US 2009/0279842 A1    Nov. 12, 2009

(30) Foreign Application Priority Data

Nov. 11, 2005  (JP) ................................. 2005-327596
Nov. 11, 2005  (JP) ................................. 2005-327597

(51) Int. Cl.
*H04N 5/932* (2006.01)
(52) U.S. Cl.
USPC ........................................................ 386/218
(58) Field of Classification Search
USPC ........................................................ 386/218
See application file for complete search history.

(56) References Cited

U.S. PATENT DOCUMENTS

| | | | | |
|---|---|---|---|---|
| 5,583,494 A | * | 12/1996 | Mizutani et al. | 340/995.14 |
| 6,222,583 B1 | * | 4/2001 | Matsumura et al. | 348/113 |
| 6,609,064 B1 | * | 8/2003 | Dean | 701/454 |
| 6,837,827 B1 | | 1/2005 | Lee et al. | |
| 2003/0063133 A1 | | 4/2003 | Foote et al. | |
| 2003/0152223 A1 | * | 8/2003 | Yamada | 380/201 |
| 2004/0217884 A1 | | 11/2004 | Samadani et al. | |
| 2005/0220349 A1 | * | 10/2005 | Furuya et al. | 382/195 |
| 2005/0286760 A1 | * | 12/2005 | Ohtomo et al. | 382/154 |

FOREIGN PATENT DOCUMENTS

| | | |
|---|---|---|
| EP | 1 173 014 A1 | 1/2002 |
| JP | 8-240854 | 9/1996 |
| JP | 8 240854 | 9/1996 |
| JP | 11-205725 | 7/1999 |

(Continued)

OTHER PUBLICATIONS

"Red Hen Systems, Inc—Media Mapper", Retrieved from the Internet: URL:http://www.afds.net/mediamapper.html>, XP002304366, Internet Citation Jul. 5, 2002, 7 pages.

(Continued)

*Primary Examiner* — Thai Tran
*Assistant Examiner* — Jose Mesa
(74) *Attorney, Agent, or Firm* — Oblon, Spivak, McClelland, Maier & Neustadt, L.L.P.

(57) ABSTRACT

Position information of image pickup positions included in a designated moving image file is read out from position of point of change information, and map information covering all the positions of the position information is obtained from a map information database by a map information obtaining portion. A map is drawn by a map drawing portion based on the position information and the map information. The drawn map is overlapped with a moving image, which is replayed by a moving image replay portion, by an overlapping portion and displayed on a display portion.

18 Claims, 16 Drawing Sheets

(56) References Cited

FOREIGN PATENT DOCUMENTS

| | | |
|---|---|---|
| JP | 11 205725 | 7/1999 |
| JP | 11-259502 | 9/1999 |
| JP | 2001-61089 | 3/2001 |
| JP | 2001-228528 | 8/2001 |
| JP | 2001-290820 | 10/2001 |
| JP | 2001-339594 | 12/2001 |
| JP | 2002-341755 | 11/2002 |
| JP | 2003 018506 | 1/2003 |
| JP | 2004-45651 | 2/2004 |
| JP | 2004 363823 | 12/2004 |
| JP | 2004-363823 | 12/2004 |

OTHER PUBLICATIONS

Berry, Joseph Ken., et al., "Practical Applications of Video Mapping in Natural Resources", Retrieved from the Internet: URL:http://www.innovativegis.com/basis/mis c/GIS01_VMS.htm>, XP002304367, Internet Citation Jul. 4, 2002, 5 pages.

U.S. Appl. No. 11/563,867, filed Nov. 28, 2006, Baiping, et al.

Japanese Office Action issued Apr. 5, 2011, in Patent Application No. 2005-327596.

Japanese Office Action issued Apr. 5, 2011, in Patent Application No. 2005-327597.

Summons to attend oral proceedings pursuant to Rule 115(1) EPC issued Sep. 25, 2012 in European Application No. 10008475.5-2202/2249562, 6 pages.

\* cited by examiner

| COMMON INFORMATION | 610 | |
|---|---|---|
| INDIVIDUAL INFORMATION OF POSITION A | START TIME OF POSITION A | END TIME OF POSITION A |
| INDIVIDUAL INFORMATION OF POSITION B | START TIME OF POSITION B | END TIME OF POSITION B |
| INDIVIDUAL INFORMATION OF POSITION C | START TIME OF POSITION C | END TIME OF POSITION C |

| | ITEM | SIZE [BYTE] |
|---|---|---|
| 611 | GPS TAG VERSION | 4 |
| 612 | GEODESIC SYSTEM | 7 |

FIG. 7

| ITEM | SIZE [BYTE] |
|---|---|
| NORTH-SOUTH DIVISION | 2 |
| LATITUDE | 24 |
| WEST-EAST DIVISION | 2 |
| LONGITUDE | 24 |
| ALTITUDE DIVISION | 1 |
| ALTITUDE | 8 |
| GPS RECEIVER STATE | 2 |
| POSITIONING RELIABILITY | 8 |
| POSITIONING TIME | 24 |
| NUMBER OF SATELLITES IN USE | 3 |
| GPS POSITIONING METHOD | 2 |
| UNIT OF SPEED | 2 |
| SPEED | 8 |
| UNIT OF PROCEEDING DIRECTION | 2 |
| PROCEEDING DIRECTION | 8 |
| UNIT OF IMAGE DIRECTION | 2 |
| IMAGE DIRECTION | 8 |

IMAGING/REPRODUCING DEVICE

TECHNICAL FIELD

The present invention relates to a pickup/replay device of a moving image, and, more particularly, to an image pickup device, a replay device, an image pickup/replay device, a processing method of these devices, and a program for causing a computer to carry out the processing method.

BACKGROUND ART

An image pickup device for picking up a moving image has become widespread and many users can pick up a moving image casually. Since a user can pick up moving images by a simple operation, the user picks up images of streets and landscapes as his or her fancy dictates. As a result, a large amount of picked up image data is accumulated.

When a large amount of moving image data is accumulated as described above, it is difficult for a user to memorize all the positions where images are picked up even if they are picked up by oneself. Accordingly, it is necessary to correlate the data of picked up moving images to the positions where they were picked up by some sort of method. For example, there is proposed a recording system for recording image data picked up by a camera portion and position data obtained by GPS (Global Positioning System) by associating them to each other (refer to, for example, Patent Document 1).

Patent Document 1 Japanese Unexamined Patent Application Publication No. 2003-18506 (FIG. 5)

DISCLOSURE OF THE INVENTION

Problems to be Solved by the Invention

In the conventional art described above, when image data is replayed, positions are displayed based on position data by recording the image data and position data. However, in the conventional art, it is not apparent when the position data is recorded. If all the position data are recorded at every predetermined intervals while moving images are picked up, there is a possibility that a large amount of data region is used depending on the intervals. In contrast, when position data is recorded in a unit of a moving image file, there is a possibility that accurate image pickup positions cannot be recorded when images are picked up while moving to different positions.

Further, when images are packed up while moving to different positions, it is preferable to easily grasp the geographical distribution of image pickup positions, which are used as candidates where moving images are replayed, and image pickup positions while moving images are being replayed.

Accordingly, an object of the present invention is to effectively record position information corresponding to moving image data and to clearly display the position information when the moving image data is relayed.

Means for Solving the Problems

The present invention is achieved to solve the above objects, and a first aspect of it resides in a moving image replay device characterized by being composed of a moving image replay means for replaying moving image data and outputting it to a replay/display screen, a position information obtaining means for obtaining position information accompanying with the moving image data, a map information obtaining means for obtaining map information that covers a plurality of positions included in the position information, a map drawing means for drawing a map on which the plurality of positions are marked based on the map information and the position information, an overlapping means for overlapping the replay/display screen with the map display screen on the same screen, and a display means for displaying the overlapped screen. With this arrangement, there can be achieved an advantage in that a map covering the plurality of positions as to the moving image data and the replay/display screen of the moving image data are overlapped with each other and displayed.

In the first aspect, the moving image data may be realized as one moving image file. With this arrangement, there can be achieved an advantage in that a plurality of positions are recorded to one moving image file and a screen is displayed from the plurality of positions.

In the first aspect, the plurality of positions may be recorded as positions for showing a change of the position information when an image is picked up. That is, only when the position information changes, the positions are recorded, and they are used when an image is replayed, thereby a processing can be effectively carried out.

In the first aspect, the moving image replay device may be further composed of map information holding means for holding map information in correspondence to the position information, and the map information obtaining means may obtain the map information that covers a plurality of positions included in the position information by searching the map information holding means. With this arrangement, there can be achieved an advantage in that the moving image replay device can independently obtain map information without using an external database.

In the first aspect, the moving image replay device may be further composed of place-name information obtaining means for obtaining place-name information corresponding to the position information, and the map drawing means may append the place-names included in the place-name information to the marks corresponding to the plurality of positions. With this arrangement, there can be achieved an advantage in that the respective positions on the map can be more clearly shown.

In the first aspect, the map drawing means may apply a special effect to the marks corresponding to the moving image data being replayed by the moving image replay means among the marks of the plurality of positions. With this arrangement, there can be achieved an advantage in that the position at which a moving image being replayed was picked up can be more clearly shown.

In the first aspect, the map drawing means may show an attribute as to the reliability of the position information to the marks of the plurality of positions. With this arrangement, there can be achieved an advantage in that a degree of correctness of the respective positions can be clearly shown.

In the first aspect, the map drawing means may time sequentially show a picked-up order to the marks of the plurality of positions. With this arrangement, there can be achieved an advantage in that the image picked-up order of the moving image data can be clearly shown.

Further, in the first aspect, the moving image replay device may be further composed of a replay position information obtaining means for obtaining position information corresponding to a replay time of the moving image data replayed by the moving image replay means as replay position information, a previous replay position information holding means for holding position information before the replay time as previous replay position information, and a replay position information comparing means for comparing the replay position information with the previous replay position information and detecting disagreement therebetween, wherein when the disagreement is detected, the map drawing means may apply a special effect to the marks corresponding to the replay position information among the marks of the plurality of positions, and when the disagreement is detected, the previous replay position information holding means may hold the replay position information as new previous replay position information. With this arrangement, there can be achieved an advantage in that each time a position changes as a replay proceeds, the position can be more clearly shown. Further, at the time, the moving image replay device may be further composed of a display update timer for measuring an obtaining interval at which the replay position information is obtained, wherein, each time the display update timer measures the obtaining interval, the replay position information obtaining means may obtain the replay position information. With this arrangement, there can be achieved an advantage in that position information can be obtained at a predetermined interval.

A second aspect of the present invention resides in an image replay device characterized by being composed of a moving image recording means for recording a picked-up image as moving image data, an image pickup position information obtaining means for obtaining the position information of an image pickup position as image pickup position information while the moving image data is being recorded, a previous image pickup position information holding means for holding the image pickup position information obtained by the image pickup position information obtaining means as previous image pickup position information, a point of change detecting means for comparing the image pickup position information with the previous image pickup position information and detecting a point of change showing that the position shown by the image pickup position information changes from the position shown by the previous image pickup position information, a position of point of change information recording means for recording, when the point of change is detected, the image pickup position information as position of point of change information, a moving image replay means for replaying the moving image data and outputting it onto a replay/display screen, a position information obtaining means for obtaining the position of point of change information accompanying with the moving image data, map information obtaining means for obtaining map information covering a plurality of positions included in the position of point of change information, a map drawing means for drawing a map, on which the plurality of positions are marked, on a map display screen based on the map information and the position of point of change information, an overlapping means for overlapping the replay/display screen with the map display screen on the same screen, and a display means for displaying the overlapped screen, wherein when the point of change is detected, the previous image pickup position holding means holds the image pickup position information as new previous image pickup position information. With this arrangement, there can be achieved an advantage in that a point of change is detected when a moving image is picked up, position information and a reduced image at the time are recorded, and a map covering the plurality of positions as to the moving image data and the replay/display screen of the moving image data are overlapped with each other and displayed.

A third aspect of the present invention resides in a moving image replay method characterized by being composed of a step of obtaining position information accompanying with moving image data, a step of obtaining map information covering a plurality of positions included in the position information, a step of drawing a map, on which the plurality of positions are marked, on a map display screen based on the map information and the position information, and a step of displaying a replay/display screen of the moving image data and the map display screen on the same screen by overlapping them with each other or a program for causing a computer to carry out these steps. With this arrangement, there can be achieved an advantage in that a map covering the plurality of positions as to the moving image data and the replay/display screen of the moving image data are overlapped with each other and displayed.

A fourth aspect of the present invention resides in a moving image replay device characterized by being composed of a position information obtaining means for obtaining position information accompanying with moving image data, a map information obtaining means for obtaining map information covering a plurality of positions included in the position information, a typical image obtaining means for obtaining a plurality of typical images corresponding to the plurality of positions, respectively, a map drawing means for drawing a map, on which the plurality of positions and typical images corresponding to them are shown, on a map display screen based on the map information and the position information, and a display means for displaying the map display screen. With this arrangement, there can be achieved an advantage in that a reduced image is displayed at a corresponding position of the map display screen and a replay of the moving image data is intuitively instructed by selecting the reduced image.

In the fourth aspect, the moving image data may be realized as one moving image file. With this arrangement, there can be achieved an advantage in that a plurality of positions are recorded to one moving image file and a screen is displayed from the plurality of positions.

In the fourth aspect, the plurality of positions may be recorded as positions for showing a change of position information when an image is picked up. That is, only when the position information changes, the positions are recorded, and they are used when an image is replayed, thereby a processing can be effectively carried out.

Further, in the fourth aspect, the moving image replay device may be further composed of an operation receiving means for receiving an operation instruction for selecting the plurality of typical images, a moving image replay means for replaying moving image data corresponding to a typical image, to which an operation instruction for selection is received by the operation receiving means, among the plurality of typical images and outputting the moving image data to a replay/display screen, and an overlapping means for overlapping the replay/display screen with the map display screen on the same screen, wherein the display means may display the overlapped screens. With this arrangement, there can be achieved an advantage in that how the moving image data is replayed can be clearly shown by selection carried out on the map display screen. Further, at the time, the overlapping means may overlap the replay/display screen on the map display screen so that a position corresponding to the moving image data being replayed becomes the center of the replay/display screen. With this arrangement, there can be achieved an advantage in that a user can be made more clearly conscious of an original position on the map display screen.

A fifth aspect of the present invention resides in a moving image replay device characterized by composed of a moving image recording means for recording a picked-up image as moving image data, an image pickup position information obtaining means for obtaining the position information of an image pickup position as image pickup position information while the moving image data is being recorded, a previous image pickup position information holding means for holding image pickup position information obtained by the image pickup position information obtaining means as previous image pickup position information, a point of change detecting means for comparing the image pickup position information with the previous image pickup position information and detecting a point of change showing that the position shown by the image pickup position information changes from the position shown by the previous image pickup position information, a position of point of change information recording means for recording, when a point of change is detected, the image pickup position information as position of point of change information, a typical image creating means for creating for creating, when a point of change is detected, a reduced image of a moving image being replayed as a typical image, a position information obtaining means for obtaining the position of point of change information, a map information obtaining means for obtaining map information covering a plurality of positions included in the position of point of change information, a typical image obtaining means for obtaining the typical images corresponding to the plurality of positions, respectively, a map drawing means for drawing a map, on which the plurality of positions and typical images corresponding to them are shown, on a map display screen based on the map information and the position information, and a display means for displaying the map display screen. With this arrangement, there can be achieved an advantage in that points of change are detected when moving images are picked up, position information and reduced images at the time are recorded, and a replay of moving image data is intuitively instructed by selecting a reduced image displayed based on the position information.

A sixth aspect of the present invention resides in a moving image replay method characterized by being composed of a step of obtaining position information accompanying with moving image data, a step of obtaining map information covering a plurality of positions included in the position information, a step of obtaining a plurality of typical images corresponding to the plurality of positions, respectively, a step of drawing a map, on which the plurality of positions and typical images corresponding to them are shown, on a map display screen based on the map information and the position information, and a step of displaying the map display screen or a program for causing a computer to carry out these steps. With this arrangement, there can be achieved an advantage in that a reduced image is displayed at a corresponding position of the map display screen and a replay of moving image data is intuitively instructed by selecting the reduced image.

Advantage of the Invention

According to the present invention, there can be achieved an excellent effect in that position information corresponding to moving image data can be effectively recorded and can be clearly displayed when the moving image data is replayed.

BRIEF DESCRIPTION OF THE DRAWINGS

FIG. 5 is a view showing an example of data structure of a position information 600 in the embodiment of the present invention.

FIG. 6 is a view showing an example of a data structure of a common information 610 of the position information 600 in the embodiment of the present invention.

FIG. 7 is a view showing an example of a data structure of an individual information 620 of the position information 600 in the embodiment of the present invention.

Figure 1:
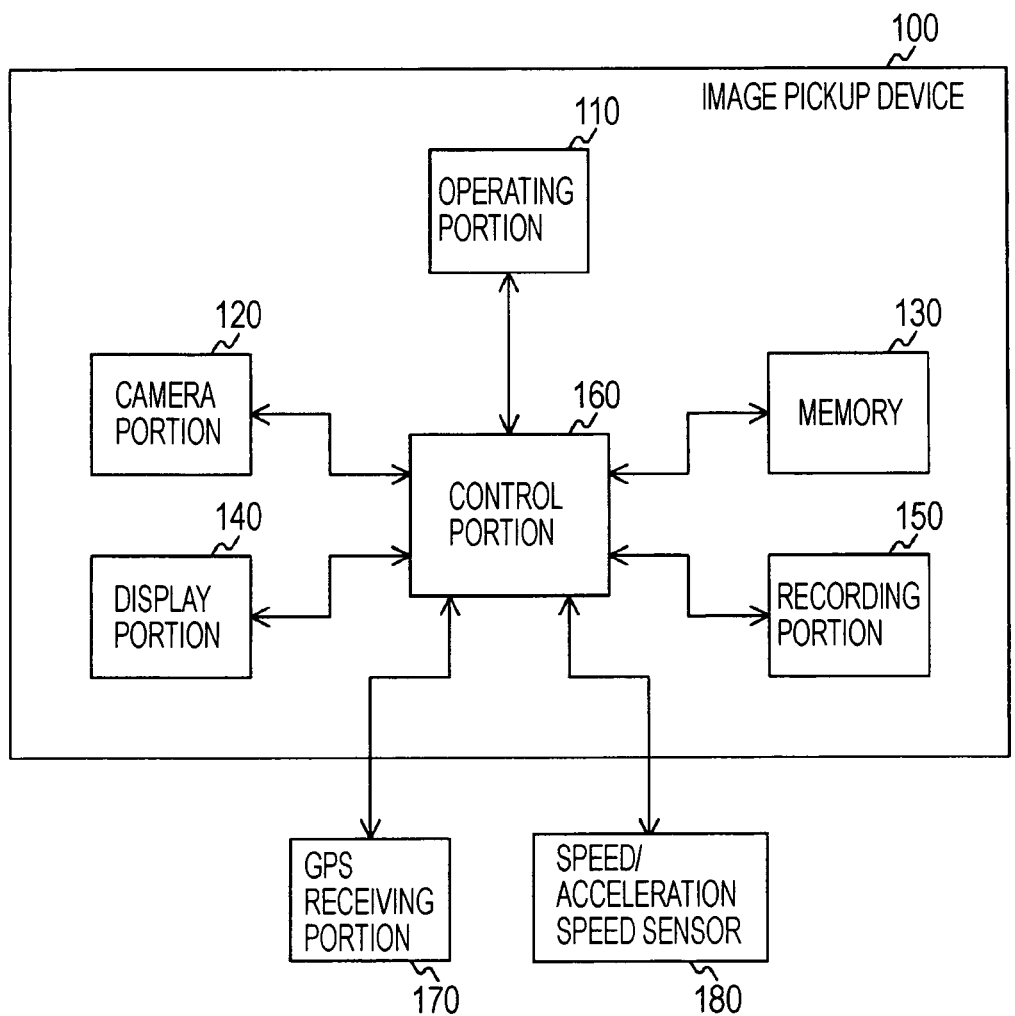
FIG. 1 is a view showing an arrangement example of an image pickup device 100 in an embodiment of the present invention.

REFERENCE NUMERALS 100 image pickup device
110 operating portion
120 camera portion
130 memory
140 display portion
150 recording portion
160 control portion
170 GPS receiving portion
180 speed/acceleration speed sensor
210 position measuring portion
220 image pickup position information obtaining portion
230 previous image pickup position information holding portion
240 point of change detecting. portion
250 position measuring timer
260 system timer
270 thumbnail creating portion
280 speed/acceleration speed measuring portion
310, 910 moving image replay portion
320, 920 replay position information obtaining portion 330, 930 previous replay position information holding portion
340 replay position information comparing position
351, 951 place-name information obtaining portion
352, 952 map information obtaining portion
360, 960 map drawing portion
370 display update timer
380, 980 overlapping portion
390, 990 display portion
410, 1010 operation receiving portion
500 moving image file
510 file header
520 moving image data
530 metadata
531 position of point of change information
532 thumbnail of point of change
700 place-name information database
800 map information database

BEST MODE FOR CARRYING OUT THE INVENTION

Next, an embodiment of the present invention will be explained with reference to the drawings in detail.

FIG. 1 is a view showing an arrangement example of an image pickup device 100 in the embodiment of the present invention. The image pickup device 100 has an operating portion 110, a camera portion 120, a memory 130, a display portion 140, a recording portion 150, and a control portion 160.

The operating portion 110 receives an operation input from a user. The operating portion 110 can be realized as an operation button disposed to the image pickup device or a touch panel integrated with the display portion 140.

The camera portion 120 picks up a subject and is composed of an optical block such as a lens and the like and a signal converting portion such as a CCD (Charge Coupled Device) and the like. The memory 130 is a working region for temporarily storing moving image data picked up by the camera portion 120, and a volatile memory is ordinarily used.

The display portion 140 displays moving images, which are being picked up, replayed moving images, and the like on a display such as an LCD (Liquid Crystal Display) and the like. Note that the display portion 140 may be arranged integrally with the operating portion 110 as described above.

The recording portion 150 records picked up moving image data and information accompanying with the picked up moving image data, and a non-volatile recording medium is ordinarily used. The control portion 160 controls the respective portions of the image pickup device 100 and is realized by, for example, a microcomputer and the like controlled by a program.

Further, the image pickup device 100 may contain a GPS receiving portion 170 and a speed/acceleration speed sensor 180 or may be externally connected thereto. The GPS receiving portion 170 receives information (position information) as to the position of the image pickup device 100 from a GPS satellite. The speed/acceleration speed sensor 180 is a sensor for sensing a speed and an acceleration speed of the image pickup device 100, and a gyro sensor for sensing an angular speed and an acceleration speed sensor for sensing an acceleration speed, for example, can be used.

Figure 2:
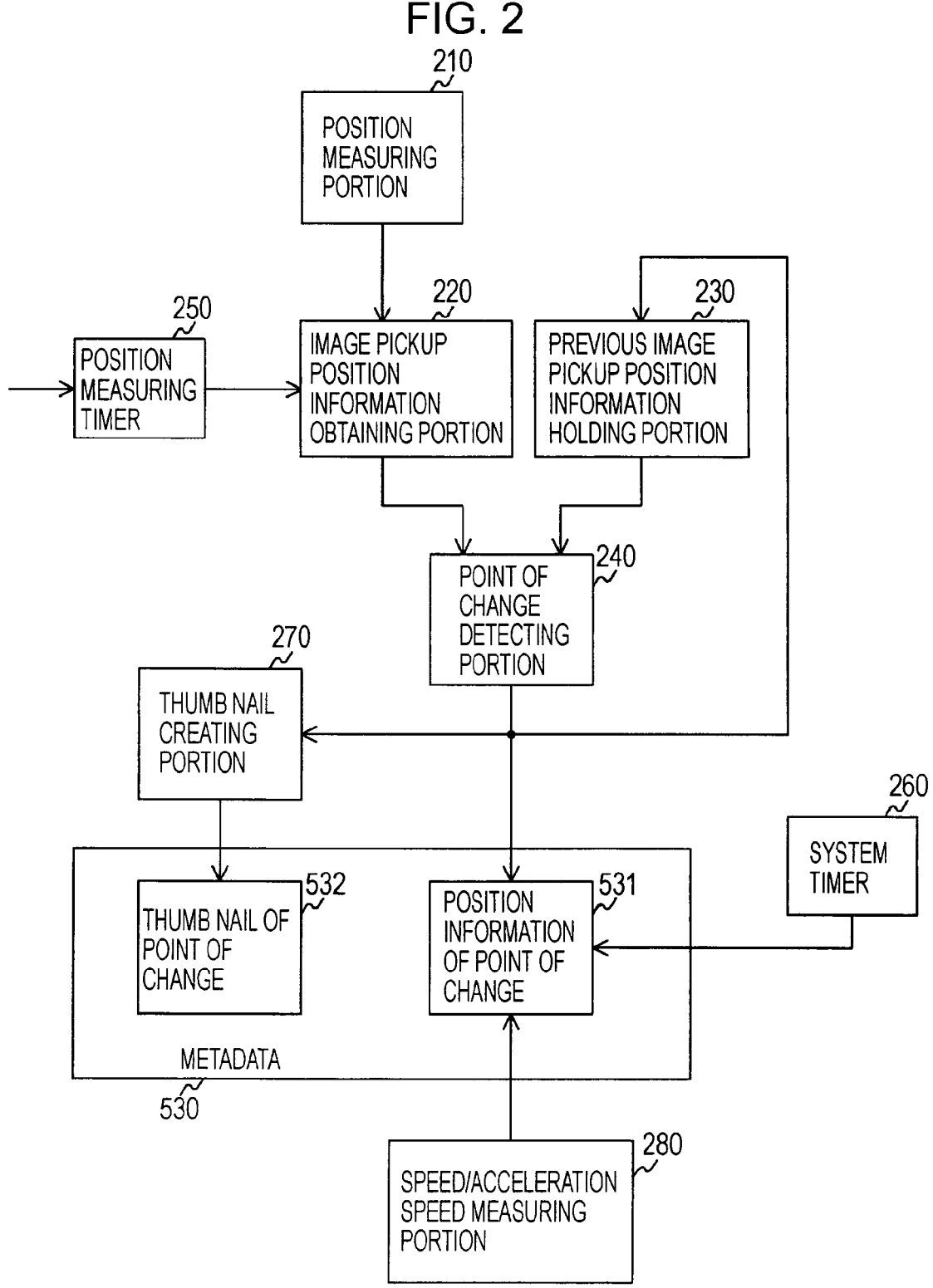
FIG. 2 is a view showing an example of a functional arrangement for recording a moving image by the image pickup device 100 in the embodiment of the present invention.

FIG. 2 is a view showing an example of a functional arrangement for recording a moving image by the image pickup device 100 in the embodiment of the present invention. Assumed here are a position measuring portion 210, an image pickup position information obtaining portion 220, a previous image pickup position information holding portion 230, a point of change detecting portion 240, a position measuring timer 250, a system timer 260, a thumbnail creating portion 210, and a speed/acceleration speed measuring portion 280.

The position measuring portion 210 measures a position where the image pickup device 100 is located, and, for example, GPS disposed outside of the image pickup device 100 is utilized. The image pickup position information obtaining portion 220 obtains the position information of an image pickup position from the position measuring portion 210 while a moving image is being picked up and corresponds to the GPS receiving portion 170 of FIG. 1. The previous image pickup position information holding portion 230 holds the position information of the image pickup position obtained by the image pickup position information obtaining portion 220 as previous image pickup position information. Here, the position information may be, for example, information as to a latitude and a longitude obtained from the GPS receiving portion 170 and further may be information as to a place-name such as a country name, a city name, an area name, and the like obtained making use of a place-name information database 700 which will be explained in FIG. 8.

The point of change detecting portion 240 compares the image pickup position information obtained by the image pickup position information obtaining portion 220 with the previous image pickup position information held by the previous image pickup position information holding portion 230, and when a position shown by the image pickup position information changes from a position shown by the previous image pickup position information, the point of change detecting portion 240 detects it as a "point of change". For example, when the point of change detecting portion 240 compares the information as to a latitude and a longitude held by the previous image pickup position information holding portion 230 with the information as to a latitude and a longitude shown by the image pickup position information and detects that the former latitude and longitude are spaced apart from the latter ones by predetermined distances, the portion 240 may detect it as the "point of change". Further, when the point of change detecting portion 240 compares a place-name held by the previous image pickup position information holding portion 230 with a place-name shown by the image pickup position information and the former place-name is different from the latter one, the portion 240 may detect it as the "point of change". It is preferable that the predetermined distance has such a degree, for example, that a place-name corresponding to the position information can change, and several hundreds meters to several kilometers may be exemplified.

Note that when the point of change detecting portion 240 detects a point of change, the portion 240 causes the previous image pickup position information holding portion 230 to hold the position shown by the image pickup position information as new previous image pickup position information. Further, when moving image data begins to be recorded, image pickup position information when a recording operation begins may be held by the previous image pickup position information holding portion 230 and the previous image pickup position information.

When the point of change detecting portion 240 detects the point of change, the image pickup position information obtained by the image pickup position information obtaining portion 220 is held by the previous image pickup position information holding portion 230 as new previous image pickup position information. Further, in this case, the image pickup position information obtained by the image pickup position information obtaining portion 220 is recorded to a position of point of change information 531 in a metadata 530. Further, at the time, a reduced image of a moving image, which corresponds to the position of point of change information 531 and is being picked up, is created by the thumbnail creating portion 270 as a thumbnail (typical image) and recorded to a thumbnail of point of change 532 in the metadata 530.

The position measuring timer 250 is a timer for measuring intervals at which the image pickup position information obtaining portion 220 obtains position information. With this arrangement, the image pickup position information obtaining portion 220 can obtain the position information from the position measuring portion 210 at predetermined intervals.

The system timer 260 measures a present time. The present time measured by the system timer 260 is recorded as a part of the position of point of change information 531 or information accompanying with the information 531.

When the point of change detecting portion 240 detects a point of change, the thumbnail creating portion 270 creates a reduced image of a moving image being picked up as a thumbnail. As described above, the thumbnail created by the thumbnail creating portion 270 is recorded to the thumbnail of point of change 532.

The speed/acceleration speed measuring portion 280 is a sensor for sensing a moving state including a speed and an acceleration speed of the image pickup device 100 and corresponds to the speed/acceleration speed sensor of FIG. 1. Accordingly, a gyro sensor for sensing an angular speed and an acceleration speed sensor for sensing an acceleration speed, for example, can be used.

The metadata 530 holds information accompanying with moving image data and includes the position of point of change information 531 and the thumbnail of point of change 532 described above. A data structure of the metadata 530 will be described below.

Figure 3:
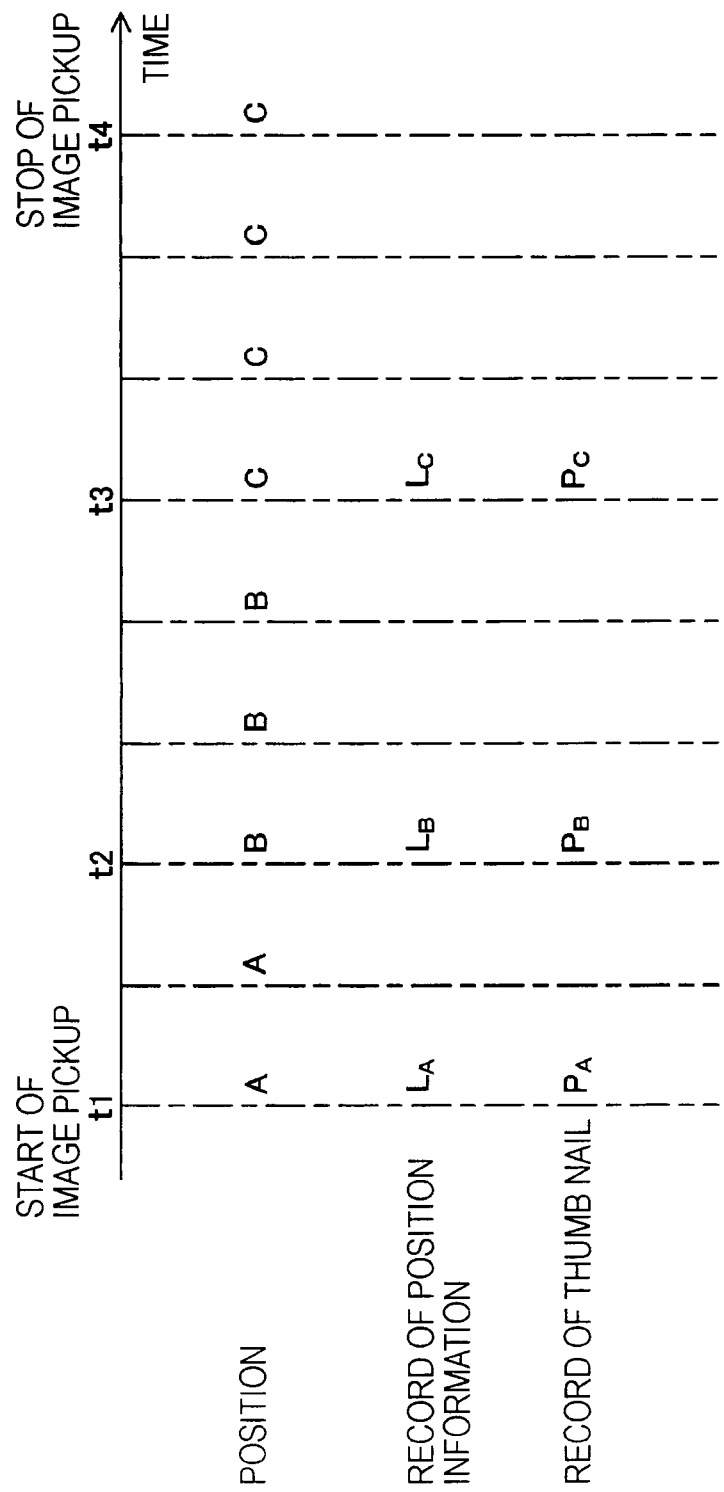
FIG. 3 is a view showing an example of recording timing of a metadata 530 in the embodiment of the present invention.

FIG. 3 is a view showing an example of timing of record of the metadata 530 in the embodiment of the present invention. It is assumed here that a moving image is picked up by the image pickup device from a time t1 to a time t4. Then, it is assumed that the image pickup position information obtaining portion 220 obtains position information from the position measuring portion 210 at predetermined intervals prescribed to the position measuring timer 250.

First, when an image pickup begins at the time t1, the image pickup position information obtaining portion 220 obtains position information at a position A, and the position information is recorded as position of point of change information LA. Further, at the time, a thumbnail is created by the thumbnail creating portion 270 recorded as a thumbnail of point of change PA. Thereafter, although position information is obtained by the image pickup position information obtaining portion 220 after a predetermined interval passes, since the position information is not spaced apart from a previous position by a predetermined distance, metadata is not recorded.

When the predetermined interval further passes and the image pickup position information obtaining portion 220 obtains position information at the time t2, since the position information is spaced apart from the previous position A by the predetermined distance, the obtained position information at a position B is recorded as position of point of change information LB. Further, at the time, a thumbnail is created by the thumbnail creating portion 270 and recorded as a thumbnail of point of change PB.

After the above operations are repeated, when the image pickup position information obtaining portion 220 obtains position information at the time t3, since the image information is spaced apart from the previous position B by the predetermined distance, the obtained position information at a position C is recorded as position of point of change information LC. Further, at the time, a thumbnail is created by the thumbnail creating portion 270 and recorded as a thumbnail of point of change PC.

As described above, the metadata is effectively recorded by recording position information and a thumbnail when position information is spaced apart from a previous position by the predetermined distance.

Figure 4:
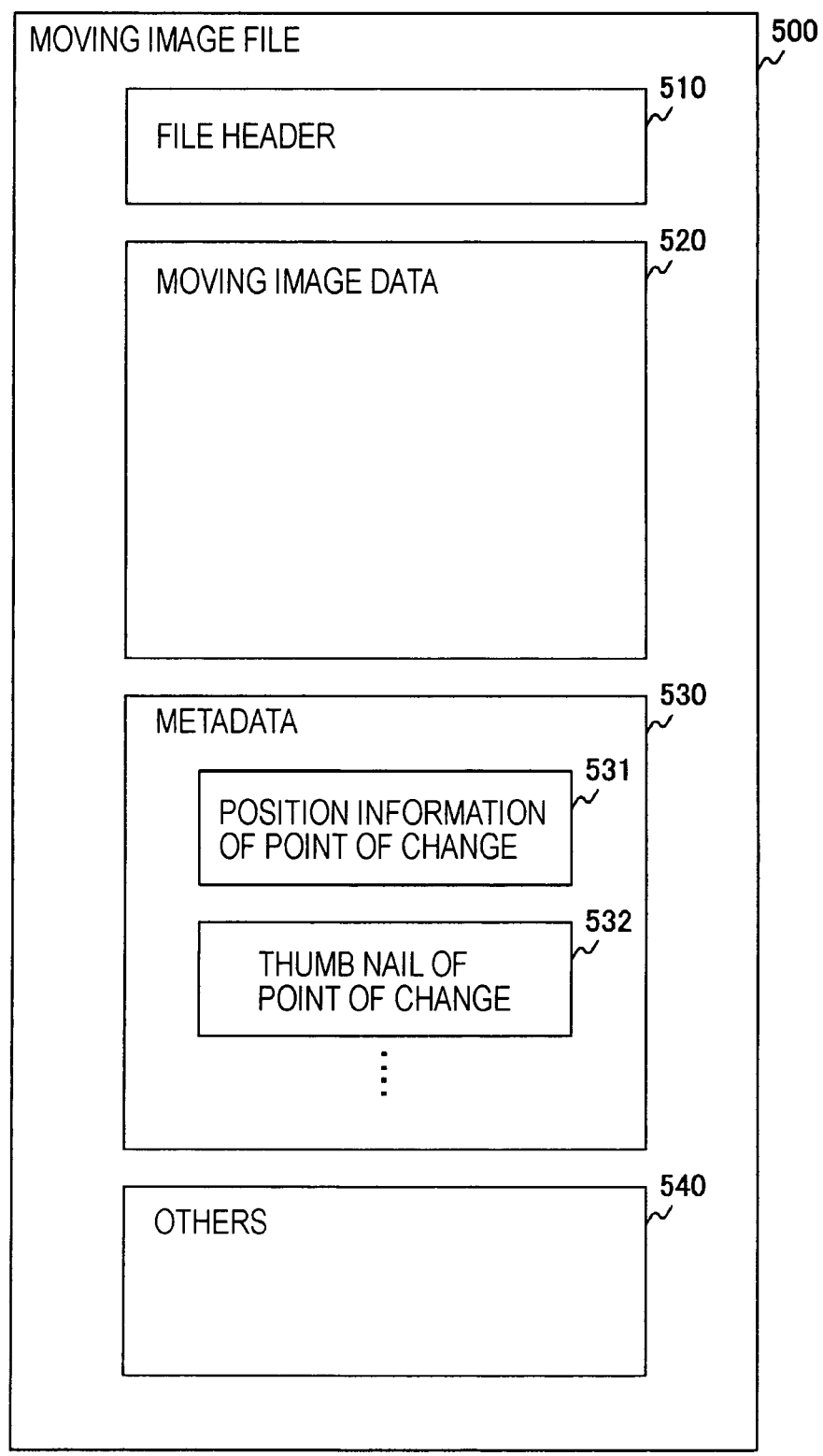
FIG. 4 is a view showing an example of a file structure of a moving image file 500 in the embodiment of the present invention.

FIG. 4 is a view showing an example a file structure of a moving image file 500 in the embodiment of the present invention. The moving image file 500 is composed of a file header 510, moving image data 520, the metadata 530, and other data 540.

The file header 510 is a region, in which the header information of the moving image file 500 is recorded, and holds the positions (addresses) and the like in the moving image data 520 and in the moving image file 500 of the metadata 530. The moving image data 520 records the contents of a moving image, and a compression system such as MPEG (Moving Picture Experts Group) format and the like is used.

The metadata 530 is a region in which information accompanying with the moving image data 520 is recorded and includes the position of point of change information 531, the thumbnail of point of change 532, and the like. The position of point of change information 531 records the position information of the image pickup device 100 when a point of change is detected by the point of change detecting portion 240. The thumbnail of point of change 532 records the thumbnail of a moving image being picked up when a point of change is detected by the point of change detecting portion 240.

FIG. 5 is a view showing an example a data structure of a position information 600 in the embodiment of the present invention. The position information 600 recorded to the position of point of change information 531 in FIG. 4 has a common information 610, an individual information 620, a start time 601, and an end time 602.

The common information 610 records information common to the overall position information 600. The individual information 620 records individual information corresponding to respective points of change. Further, the start time 601 and the end time 602 record the start time and the end time of a moving image corresponding to the individual information 620.

As described above, the individual information 620 as to a plurality of image pickup positions and the start times and the end times of moving images picked up at the positions are recorded to the position information 600.

FIG. 6 is a view showing an example of a data structure of the common information 610 of the position information 600 in the embodiment of the present invention. The common information 610 holds a GPS tag version 611 of 4 bytes (1 byte is composed of 8 bits) and a geodesic system 612 of 7 bytes.

The GPS tag version 611 shows a version of a format used in the individual information 620. The geodesic system 612 shows a geodetic reference of latitudes and longitudes used in the individual information 62. Japanese geodesic system called Tokyo Datum and World Geodesic System such as WGS-84 and the like, for example, are used as the geodesic system 612.

FIG. 7 is a view showing an example of a data structure of the individual information 620 of the position information 600 in the embodiment of the present invention. The individual information 620 is composed of an essential item 630 of 100 bytes and an optional item 640 of 30 bytes.

The essential item 630 is composed of a north-south division 621 of 2 bytes, a latitude 622 of 24 bytes, a west-east division 623 of 2 bytes, a longitude 624 of 24 bytes, an altitude division 625 of 1 byte, an altitude 626 of 8 bytes, a GPS receiver state 627 of 2 bytes, a positioning reliability 628 of 8 bytes, a positioning time 629 of 24 bytes, a number of satellites in use 631 of 3 bytes, and a GPS positioning method 632 of 2 bytes. These data correspond to the data measured by the position measuring portion 210.

The latitude 622 shows an latitude positioned by GPS. The north-south division 621 separately shows a north latitude and a south latitude of the latitude 622. The longitude 624 shows a longitude positioned by GPS. The west-east division 623 separately shows an east longitude and a west longitude of the longitude 624. The altitude 62 shows an altitude measured by GPS. The altitude division 625 shows a division of the altitude 626 such as an altitude above sea level and the like.

The GPS receiver state 627 separately shows success and failure of positioning carried out by GPS. The positioning reliability 628 shows a value of DOP (Dilution Of Precision) of positioning carried out by GPS, that is, a degree of deterioration of a measuring accuracy, and indexes of, for example, about four stages (A to D, etc.) can be applied according to the degree of deterioration. The positioning time 629 shows a time at which positioning is carried out. The number of satellites in use 631 shows the number of GPS satellites used for positioning. The GPS positioning method 632 separately shows two-dimensional positioning and three-dimensional positioning.

Further, the optional item 640 is composed of a unit of speed 641 of 2 bytes, a speed 642 of 8 bytes, a unit of traveling direction 643 of 2 bytes, a unit of traveling direction 644 of 8 bytes, a unit of image direction 645 of 2 bytes, and an image direction 646 of 8 bytes. These data correspond to the data measured by the speed/acceleration speed measuring portion 280.

The speed 642 shows a measured speed. The unit of speed 641 shows a unit of the speed 642. The traveling direction 644 shows a traveling direction of the image pickup device 100. The unit of traveling direction 643 shows a unit of the traveling direction 644. The image direction 646 shows a direction of an image being picked up. The unit of image direction 645 shows a unit of the image direction 646.

Figure 8:
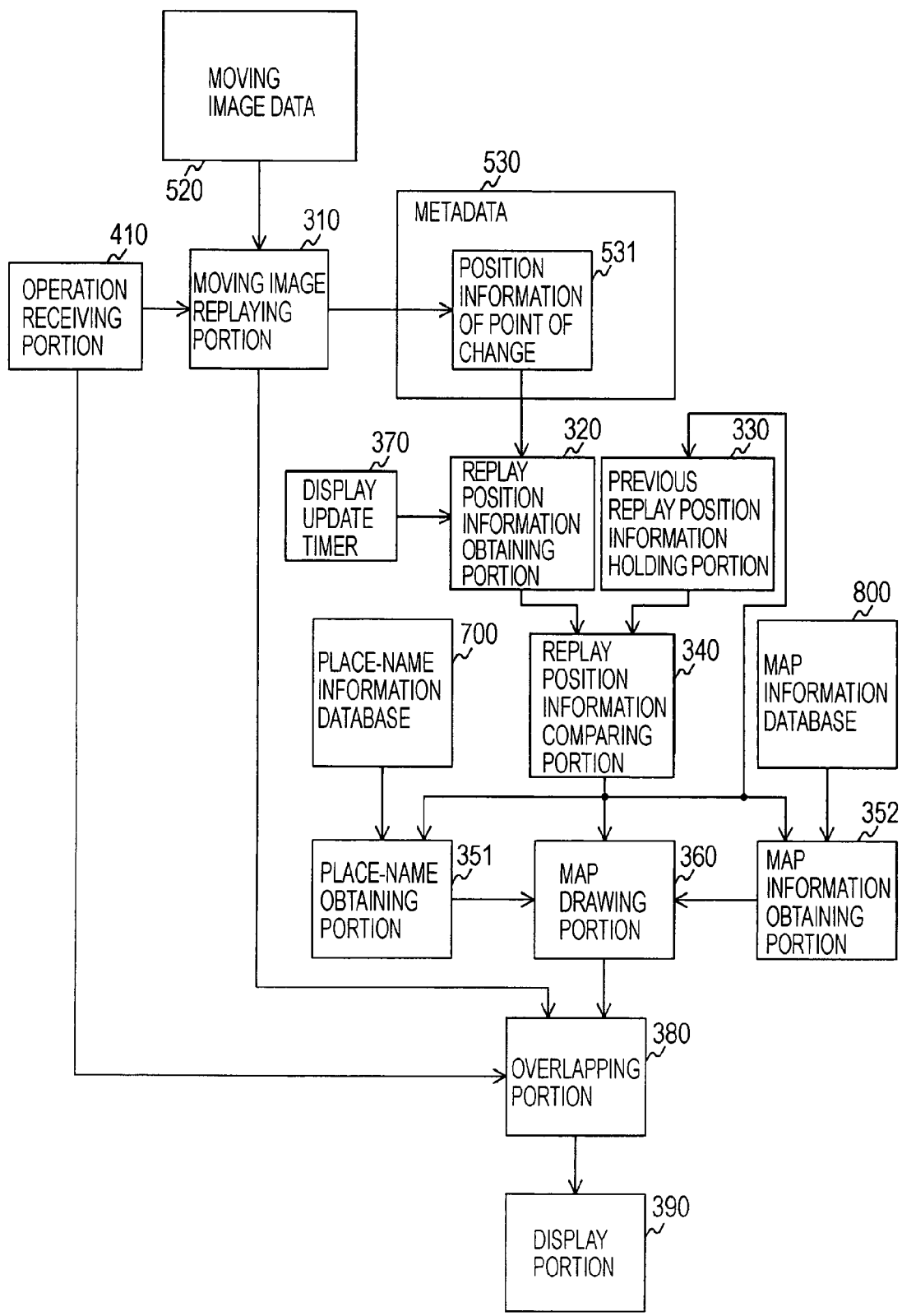
FIG. 8 is a view showing an example of a functional arrangement for the image pickup device 100 to replay a moving image in the embodiment of the present invention.

FIG. 8 is a view showing an example of a first functional arrangement for the image pickup device 100 to replay a moving image in the embodiment of the present invention. Assumed here are a moving image replay portion 310, a replay position information obtaining portion 320, a previous replay position information holding portion 330, a replay position information comparing portion 340, a place-name information obtaining portion 351, a map information obtaining portion 352, a map drawing portion 360, a display update timer 370, an overlapping portion 380, a display portion 390, an operation receiving portion 410, a place-name information database 700, and a map information database 800.

The moving image replay portion 310 replays a moving image in the moving image data 520. A time at which a moving image is replayed by the moving image replay portion 310, that is, a time corresponding to a moving image portion being replayed is used to search the position of point of change information 531.

The replay position information obtaining portion 320 searches the position of point of change information 531 using the time at which the moving image is replayed by the moving image replay portion 310 and obtains the information of the position at which the moving image portion being replayed was picked up as replay position information. That is, a corresponding moving image portion is specified by comparing the start time 601 and the end time 602 in the position information 600 with the replay time, thereby individual information of a corresponding position is obtained.

The previous replay position information holding portion 330 holds position information before the replay time at which the moving image is replayed by the moving image replay portion 310 as previous replay position information. The replay position information comparing portion 340 compares the replay position information obtained by the replay position information obtaining portion 320 with the previous replay position information held by the previous replay position information holding portion 330 and detects disagreement therebetween.

When the replay position information comparing portion 340 detects the disagreement, the replay position information obtained by the replay position information obtaining portion 320 is held by the previous replay position information holding portion 330 as new previous replay position information.

The place-name information database 700 is a database for holding the place-name information and the position information in association with each other. When the replay position information comparing portion 340 detects the disagreement, the place-name information obtaining portion 351 obtains relevant place-name information by searching the place-name information database 700 using the replay position information obtained by the replay position information obtaining portion 320.

The map information database 800 is a database for holding map information for drawing a map by associating it with position information obtained by a latitude and a longitude. When the replay position information comparing portion 340 detects the disagreement, the map information obtaining portion 352 obtains relevant map information by searching the map information database 800 using the replay position information obtained by the replay position information obtaining portion 320.

The map drawing portion 360 draws a map on which an image pickup position is appended based on the map information obtained by the map information obtaining portion 352, the replay position information obtained by the replay position information obtaining portion 320, and the place-name information obtained by the place-name information obtaining portion 351. Further, as a replay proceeds, the map drawing portion 360 clearly shows an image pickup position by applying a special effect such as lighting, flashing, and the like to a corresponding position.

The display update timer 370 measures obtaining intervals at which the replay position information is obtained to update a display on the display portion 390. The replay position information obtaining portion 320 obtains the replay position information from the position of point of change information 531 each time the display update timer 370 measures the obtaining intervals at which it is obtained.

The overlapping portion 380 overlaps a map drawn by the map drawing portion 360 with a moving image replayed by the moving image replay portion 310 and creates display data for one screen. The display portion 390 displays the display data created by the overlapping portion 380 on a display such as an LCD and the like. The operation receiving portion 410 receives an operation instruction input from a user, and it is possible to assume, for example, an operation button disposed to the image pickup device, a touch panel integrated with the display portion 390, and the like.

Figure 9:
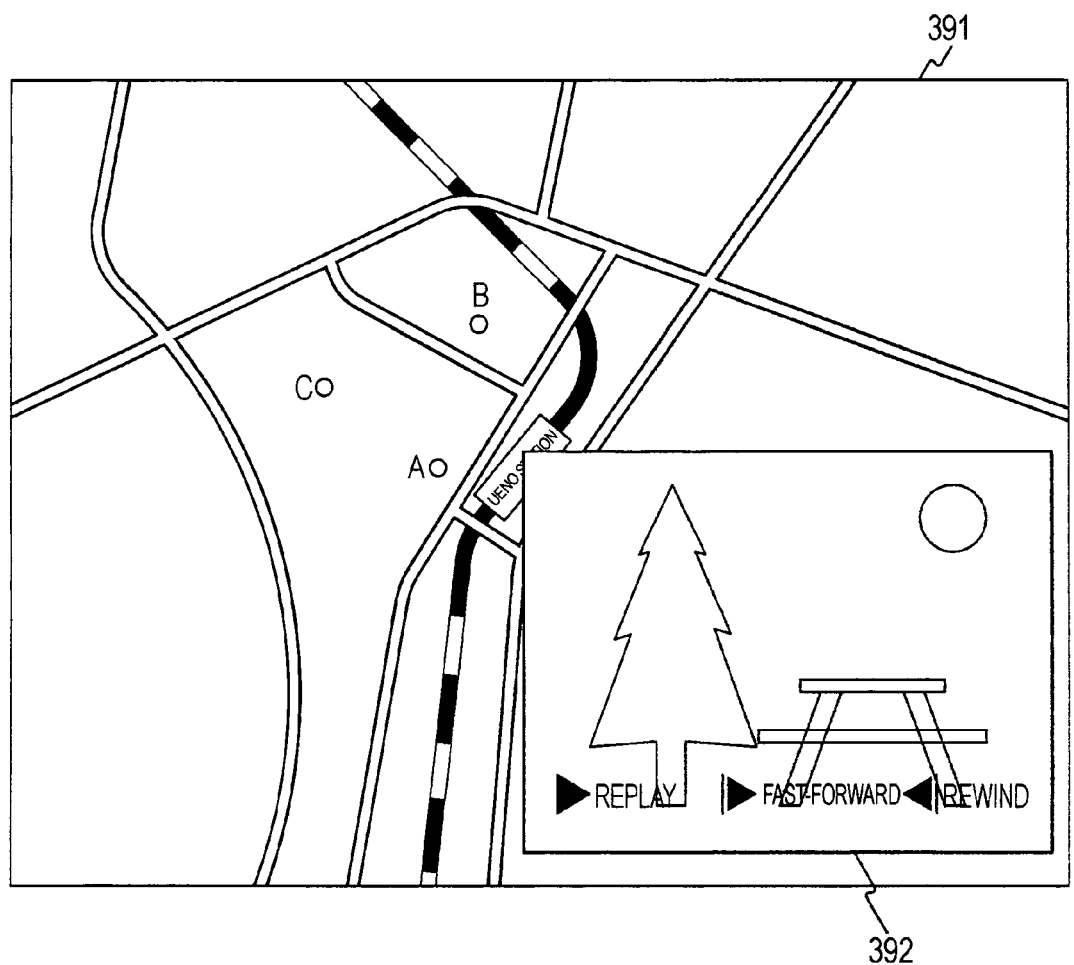
FIG. 9 is a view showing a first display example of a screen before a moving image is replayed in the embodiment of the present invention.

FIG. 9 is a view showing a first display example of a screen before a moving image is replayed in the embodiment of the present invention. When the operation receiving portion 410 receives an instruction for selecting a moving image file, a map display screen 391 overlapped with a replay/display screen 392 is displayed on the display portion 390.

The image pickup positions (in the example, three positions) of a moving image included in the selected moving image file are drawn and marked on a map on the map display screen 391. These image pickup positions are obtained from the position of point of change information 531 of the metadata 530 by the replay position information obtaining portion 320. Further, the map is obtained from the map information database 800 by the map information obtaining portion 352. Further, place-names (in the example, position A, position B, and position C) appended to the image pickup positions are obtained from the place-name information database 700.

Attribute information can be displayed to the marks of the image pickup position according to the image pickup positions by a color, a pattern, and the like. When, for example, the GPS receiver state 627 of the position information shows that positioning is failed, red color is applied to the image pickup positions to display that image pickup positions are determined by assumption. Further, it is also possible to display a degree of correctness (probability) of the image pickup positions by changing their color from blue to red according to the positioning reliability 628 of the position information.

Note that although a circular shape is employed as a shape of the mark of the image pickup position here, the shape of the mark is not limited to the circular shape and a polygonal shape and a star shape may be employed.

An image at the leading end of the selected moving image file is displayed on the replay/display screen 392 as a still image. A display indicating that the operation instruction is received is shown on the replay/display screen 392, and when a replay is instructed through the operation button and the touch panel, a replay operation is carried out from the leading end of the moving image file. Note that it is called Contents On Map that a moving image is displayed as contents on the map as described above.

Figure 10:
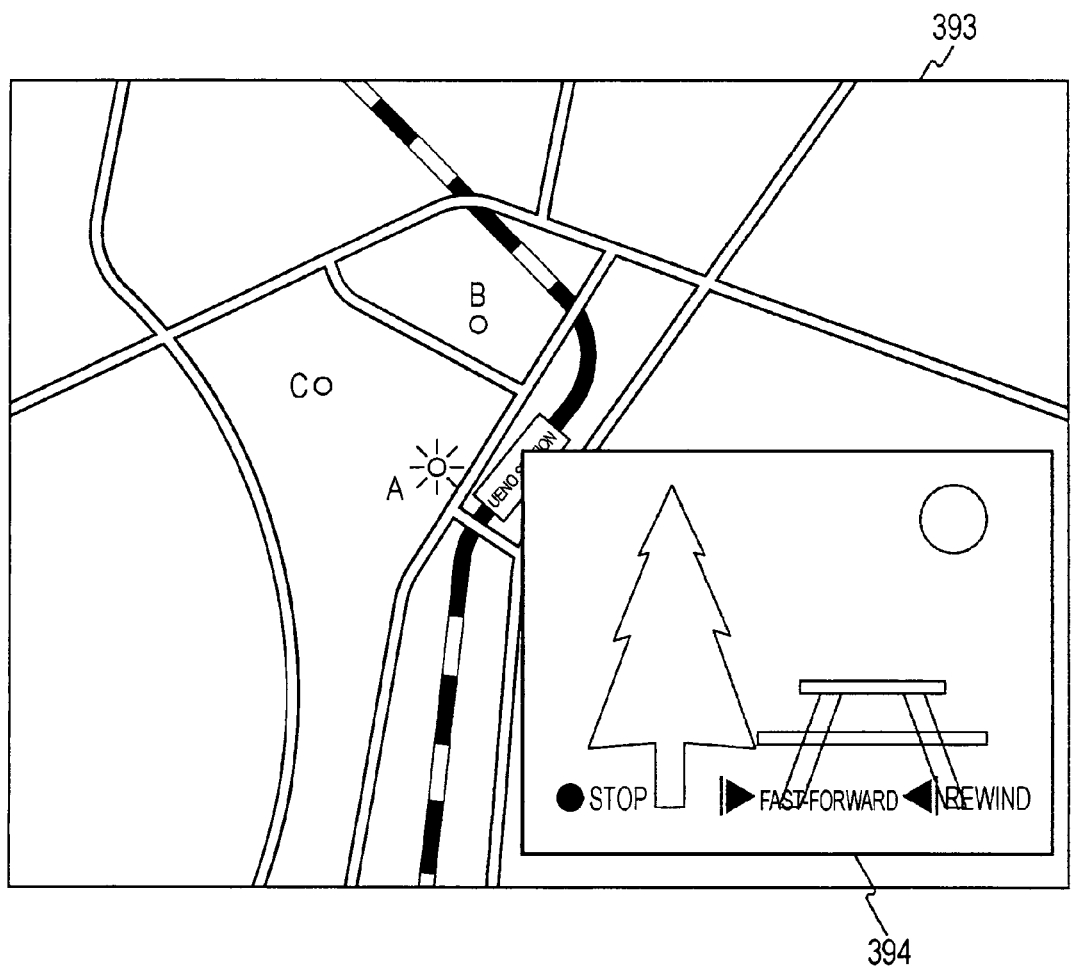
FIG. 10 is a view showing a first display example of the screen while the moving image is being replayed in the embodiment of the present invention.

FIG. 10 is a view showing a first display example of the screen while the moving image is being replayed in the embodiment of the present invention. When the moving image begins to be replayed, the image pickup position of the moving image, which is being replayed on the replay/display screen 392, is displayed on a map display screen 393. The image pickup position can be displayed by being provided with a special effect by, for example, a display method of lighting or flashing the mark of the corresponding image pickup position.

The display of the screen of the image pickup position is updated each time the display update timer 370 measures the obtaining intervals. When the display update timer 370 measures the obtaining intervals, it is determined whether or not the image pickup position of a moving image being replayed is different from the image pickup position replayed previous time, and when they are different from each other, the image pickup position is updated to a latest image pickup position. As described above, the mark of an image pickup position while a moving image is being reproduced is controlled by being lit or flashed.

When an operation instruction is issued to stop the replay from the replay state of FIG. 10, the replay of the moving image is stopped, and the moving image shifts to a state similar to that of FIG. 9 again. When an operation instruction for replay is issued in FIG. 9, the moving image shifts to the replay state of FIG. 10 again. Further, when an operation instruction is issued to select the mark of an image pickup position on the map display screen 391 or 393 regardless of a replay state, the moving image shifts to a replay state in which it was picked up at the position.

Further, image pickup orders may be time-sequentially shown to the respective image pickup positions on the map display screen 391 or 393. For example, a serial number may be appended as the image pickup order, and further image pickup times may be shown. Further, the respective image pickup positions may be connected by arrows so that the image pickup order can be tracked back.

Figure 11:
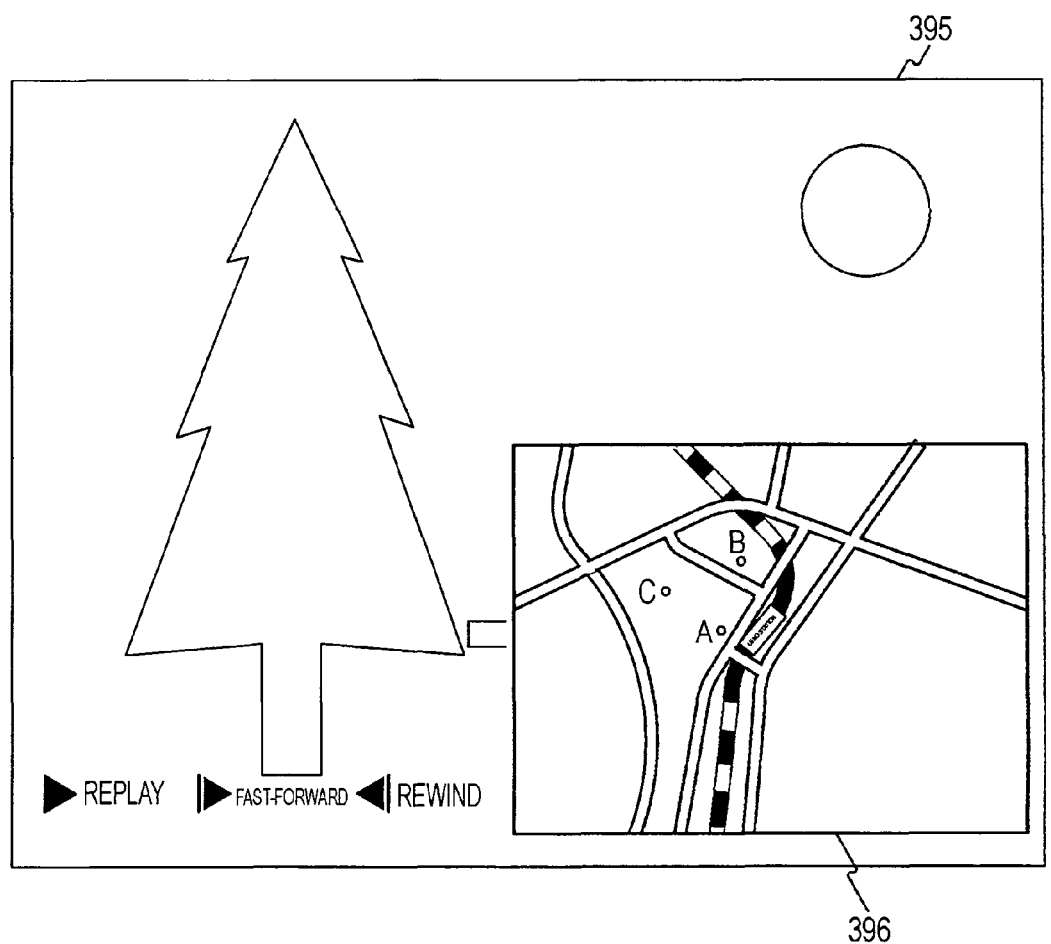
FIG. 11 is a view showing a second display example of the screen before the moving image is replayed in the embodiment of the present invention.

FIG. 11 is a view showing a second display example of the screen before the moving image is replayed in the embodiment of the present invention. Although a display example of Contents On Map, in which the moving image is displayed on the map as the contents, is shown in FIG. 9, a map display screen 396 may be displayed in a state that it is overlapped on a replay/display screen 395 as shown in FIG. 11. It is called Map On Contents that a map is displayed on a moving image as contents as described above.

Note that the user can selectively switch between Contents On Map and Map On Contents, and the operation receiving portion 410 receives an instruction for selecting them. The operation receiving portion 410 instructs the overlapping portion 380 to switch them. Further, When the screens are overlapped by the overlapping portion 380, the screen located forward may be displayed in a semi-transparent state by an α blending method and the like.

Figure 12:
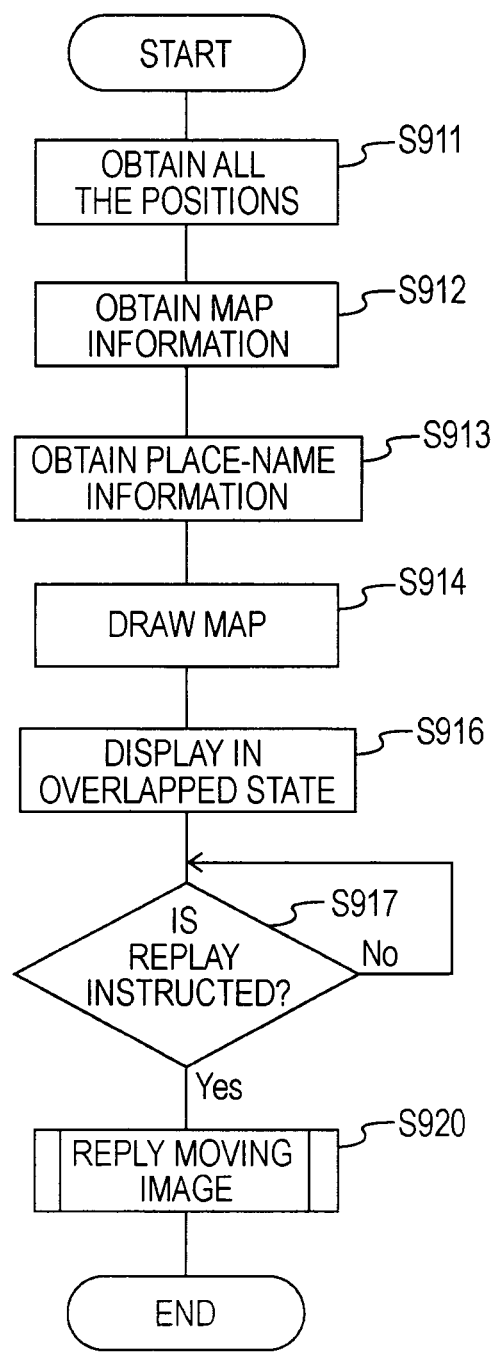
FIG. 12 is a first flowchart showing an example of processing steps until the moving image is replayed in the embodiment of the present invention.

FIG. 12 is a first flowchart showing an example of processing steps until the moving image is replayed in the embodiment of the present invention. When a moving image file is designated, the position of point of change information 531 of the metadata 530 of the moving image file is read out by the replay position information obtaining portion 320, and all the position information of the moving image file is obtained (step S911).

The map information obtaining portion 352 obtains map information which covers all the positions included in the obtained position information (step S912) as well as the place-name information obtaining portion 351 obtains the place-name information of the respective positions (step S913). Then, the map drawing portion 360 draws a map to be displayed on the map display screen 391 based on the obtained position information, map information, and place-name information (step S914).

The map display screen 391 created as described above is overlapped with the replay/display screen 392 in the extreme end frame of the moving image file by the overlapping portion 380 and displayed on the display portion 390 (step S916). Thereafter, when a moving image replay instruction is received by the operation receiving portion 410 (step S917), the moving image replay portion 310 begins to replay the moving image (step S920).

Figure 13:
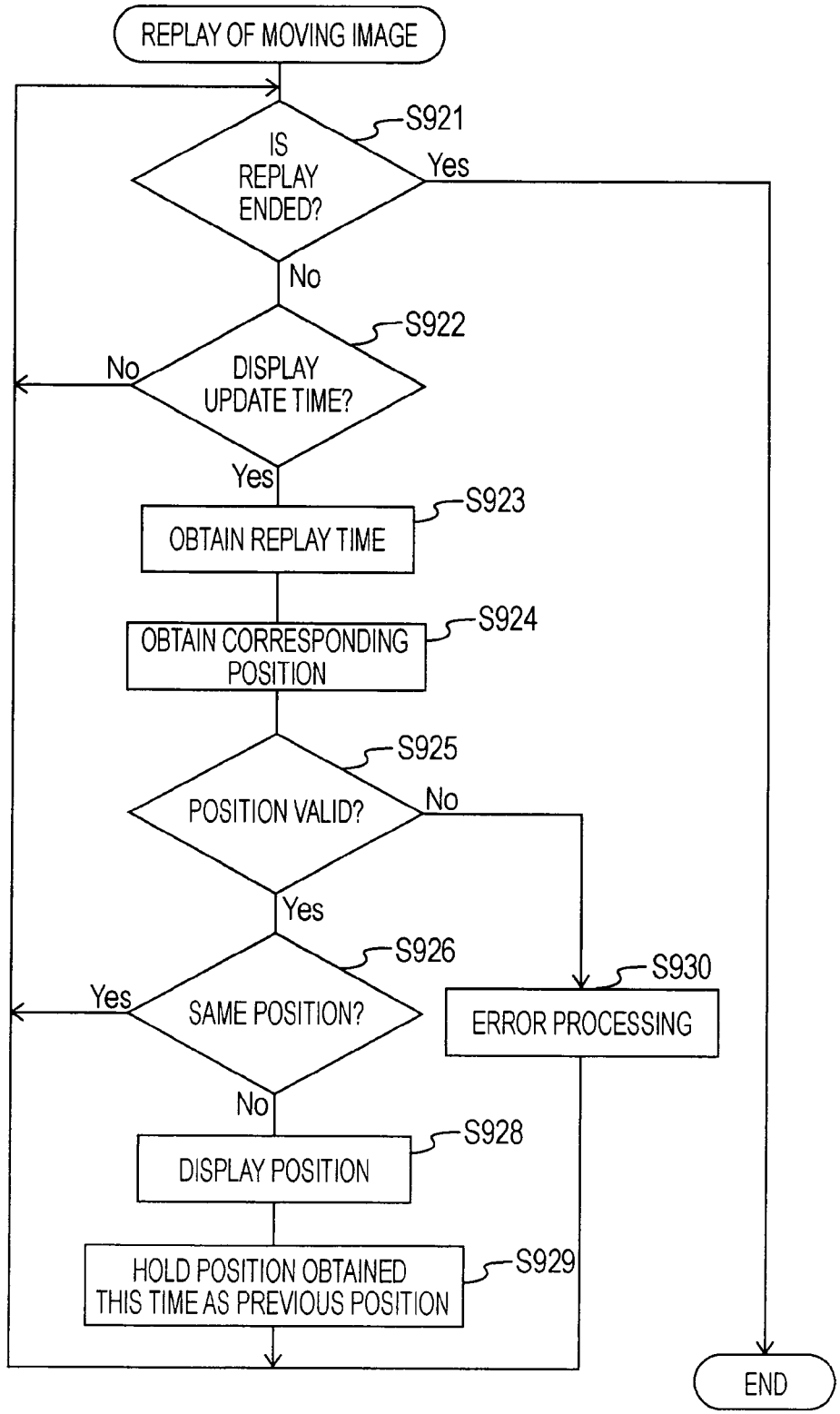
FIG. 13 is a first flowchart showing an example of processing steps for replaying the moving image in the embodiment of the present invention.

FIG. 13 is a flowchart showing an example of processing steps for replaying the moving image in the embodiment of the present invention. While the moving image is being replayed, the display update timer 370 carries out a time measuring operation, and when a time at which a display is to be updated is reached (step S922), a replay time is obtained from the moving image replay portion 310 (step S923), and corresponding position information is obtained by the replay position information obtaining portion 320 (step S924). At the time, when the obtained position information is not effective due to positioning failure and the like, an error processing is carried out and a display of position is interrupted (step S930).

When the obtained position information shows a position different from a previous position, an image pickup position is clearly shown by applying a special effect of lighting or flashing a mark at a corresponding position on a map (step S928). Further, the position information obtained this time is held by the previous replay position information holding portion 330 as new previous position information (step S929).

These operations are repeated until the moving image has been replayed. (step S921).

As described above, according to the embodiment of the present invention, when the position information obtained by the replay position information obtaining portion 320 shows a different position as a replay proceeds, a position when a moving image is replayed can be clearly shown by lighting or flashing a mark at a corresponding position on a map.

Note that the example in which when a moving image is replayed, the replay position information obtaining portion 320 obtains the position of point of change information 531 and the replay position information comparing portion 340 detects disagreement is explained, the present invention is by no means limited thereto. When moving image data, in which only points of change are associated with each other, is to be replayed, the points of change may be detected from associated metainformation, and the position information of the points of change may be displayed together with the moving image in an overlapped state while switching the position information at the points of change without the need of detecting disagreement by the replay position information comparing portion 340.

Figure 14:
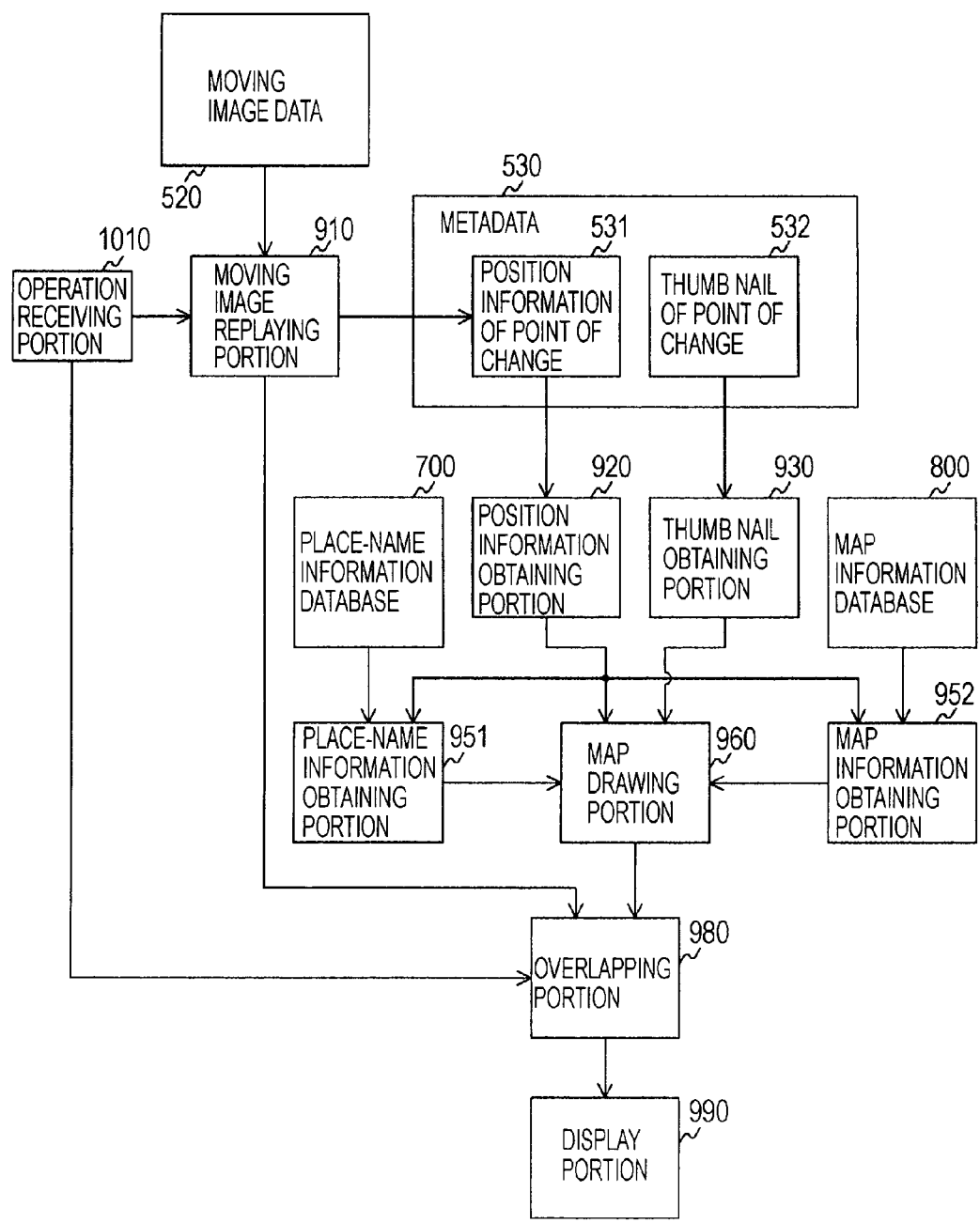
FIG. 14 is a view showing an example of a second functional arrangement for the image pickup device 100 to replay the moving image in the embodiment of the present invention.

FIG. 14 is a view showing a second example of the functional arrangement for the image pickup device 100 to replay the moving image in the embodiment of the present invention. Assumed here are a moving image replay portion 910, a position information obtaining portion 1120, a thumbnail obtaining portion 930, a place-name information obtaining portion 951, a map information obtaining portion 952, a map drawing portion 960, an overlapping portion 980, a display portion 990, an operation receiving portion 1010, a place-name information database 700, and a map information database 800.

The moving image replay portion 910 replays a moving image of the moving image data 520. A replay time of the moving image replayed by the moving image replay portion 910, that is, a time corresponding to a moving image portion being replayed is used to search the position of point of change information 531.

When an overall map is drawn, the position information obtaining portion 1120 obtains the position information of respective positions from the position of point of change information 531. Further, when the moving image is being replayed, the position information obtaining portion 1120 obtains the position information of a replay position by searching the position of point of change information 531 using the replay time of the moving image replayed by the moving image replay portion 910. When the position of point of change information 531 is searched using the replay time, the individual information of a corresponding position is specified by specifying a corresponding moving image portion by comparing the start time 601 of the position information with the end time 602 thereof.

When an overall map is drawn, the thumbnail obtaining portion 930 obtains thumbnails of respective positions from the thumbnail of point of change 532.

The place-name information database 700 is a database for holding place-name information by associating it with position information. When the overall map is drawn, the place-name information obtaining portion 951 obtains associating place-name information by searching the place-name information database 700 using the position information obtained by the position information obtaining portion 1120.

The map information database 800 is a database for holding map information for drawing a map by associating it with position information shown by a latitude and a longitude. When an overall map is drawn, the map information obtaining portion 952 obtains associating map information by searching the map information database 800 using the position information obtained by the position information obtaining portion 1120.

The map drawing portion 960 draws a map on which an image pickup position is appended based on the map information obtained by the map information obtaining portion 952, the position information obtained by the position information obtaining portion 1120, the place-name information obtained by the place-name information obtaining portion 951, and the thumbnail obtained by the thumbnail obtaining portion 930.

The overlapping portion 980 creates display data for one screen by overlapping a map drawn by the map drawing portion 960 with a moving image replayed by the moving image replay portion 910. The display portion 990 displays the display data created by the overlapping portion 980 on a display such as an LCD and the like. The operation receiving portion 1010 receives an operation instruction input from the user, and, for example, an operation button disposed to the image pickup device, a touch panel integrated with the display portion 990 and the like can be assumed.

Figure 15:
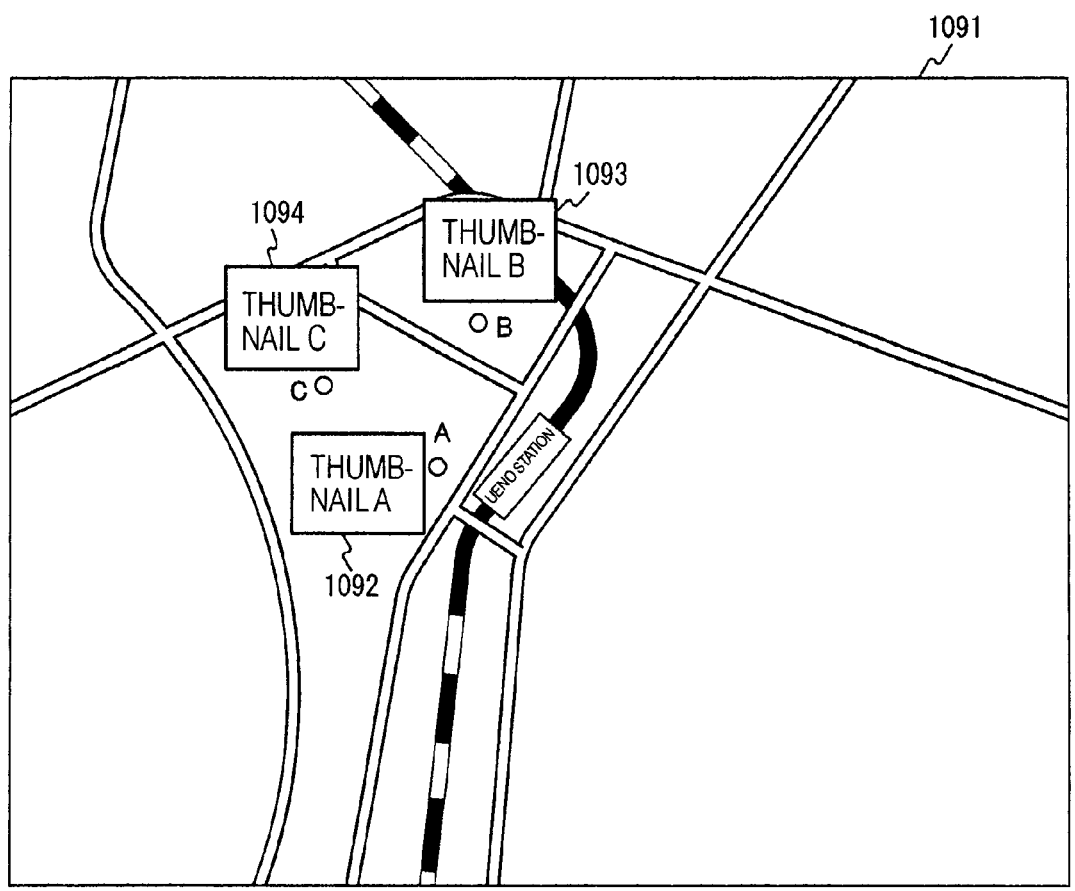
FIG. 15 is a view showing a third display example of the screen before the moving image is replayed in the embodiment of the present invention.

FIG. 15 is a view showing a third display example of the screen before the moving image is replayed in the embodiment of the present invention. When the operation receiving portion 1010 receives an instruction for selecting a moving image file, a map display screen 1091 is displayed on the display portion 990.

The image pickup positions (in the example, three positions) of a moving image included in a moving image file selected by the operation receiving portion 1010 are display and marked on the map display screen 1091. These image pickup positions are obtained from the position of point of change information 531 of the metadata 530 by the position information obtaining portion 1120. The map is obtained from the map information database 800 by the map information obtaining portion 952. Further, place-names (in the example, a position A, a position B, and a position C) appended to the image pickup positions are obtained from the place-name information database 700.

Attribute information can be displayed to the marks of the image pickup position according to the image pickup positions by a color, a pattern, and the like. When, for example, the GPS receiver state 627 of the position information shows that positioning is failed, red color is applied to the image pickup positions to display that image pickup positions are determined by assumption. Further, it is also possible to display a degree of correctness (probability) of the image pickup positions by changing their color from blue to red according to the positioning reliability 628 of the position information. Note that although a circular shape is employed as a shape of the mark of the image pickup position here, the shape of the mark is not limited to the circular shape and a polygonal shape and a star shape may be employed Thumb nails (in the example, three positions of thumbnails A (1092), B (393), and C (1094)) in the respective positions of the moving image included in the moving image file selected by the operation receiving portion 1010 are displayed on the map display screen 1091. These thumbnails are obtained from the thumbnail of point of change 532 by the thumbnail obtaining portion 930.

When the operation receiving portion 1010 instructs to select any of the thumbnails on the screen before the moving image is replayed, a corresponding moving image begins to be replayed.

Figure 16:
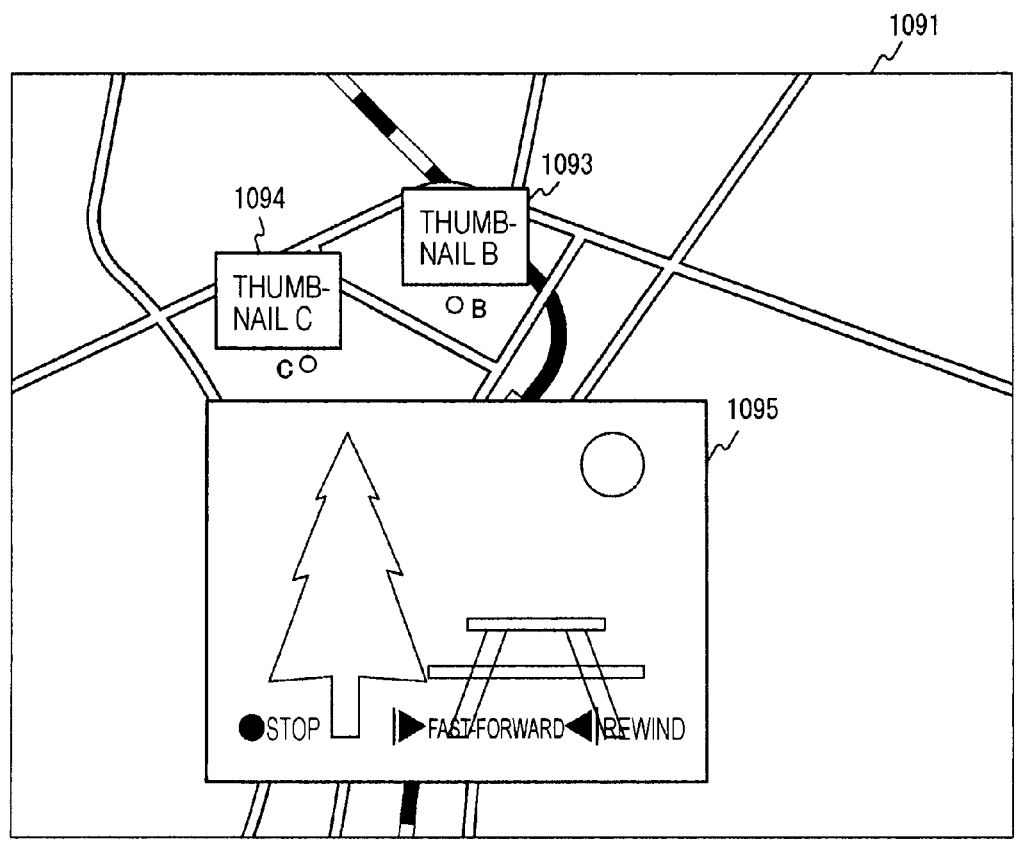
FIG. 16 is a view showing a second display example of the screen while the moving image is being replayed in the embodiment of the present invention.

FIG. 16 is a view showing a second display example of the screen while the moving image is being replayed in the embodiment of the present invention. Since the operation receiving portion 1010 instructs to select the thumbnail A (1092) here, a moving image corresponding to the thumbnail A (1092) is displayed on a replay/display screen 1095. The replay/display screen 1095 is overlapped by the overlapping portion 980 such that the position A is located at a center. More specifically, when it is instructed to select the thumbnail B (1093), a moving image corresponding to the thumbnail B (393) is displayed at the center of the position B, and further when it is instructed to select the thumbnail C (1094), a moving image corresponding to the thumbnail C (1094) is displayed at the center of the position C.

On the completion of the replay of the moving image corresponding to the thumbnail A (1092), the screen returns to the screen exemplified in FIG. 9 again and waits for an operation instruction from the user. Otherwise, the replay/display screen 1095 of a moving image corresponding to the thumbnail B (1093) may be displayed at the center of the position B according to the recording order of a moving image file, and then the replay/display screen 1095 of the moving image corresponding to the thumbnail C (1094) may be displayed at the center of the position C.

Note that although an example of so-called Contents On Map in which the replay/display screen 1095 is displayed on a map as contents is shown here, the present invention is by no means limited thereto, and the replay/display screen 1095 may be disposed to the overall display portion 990 of the replay/display screen 1095.

Figure 17:
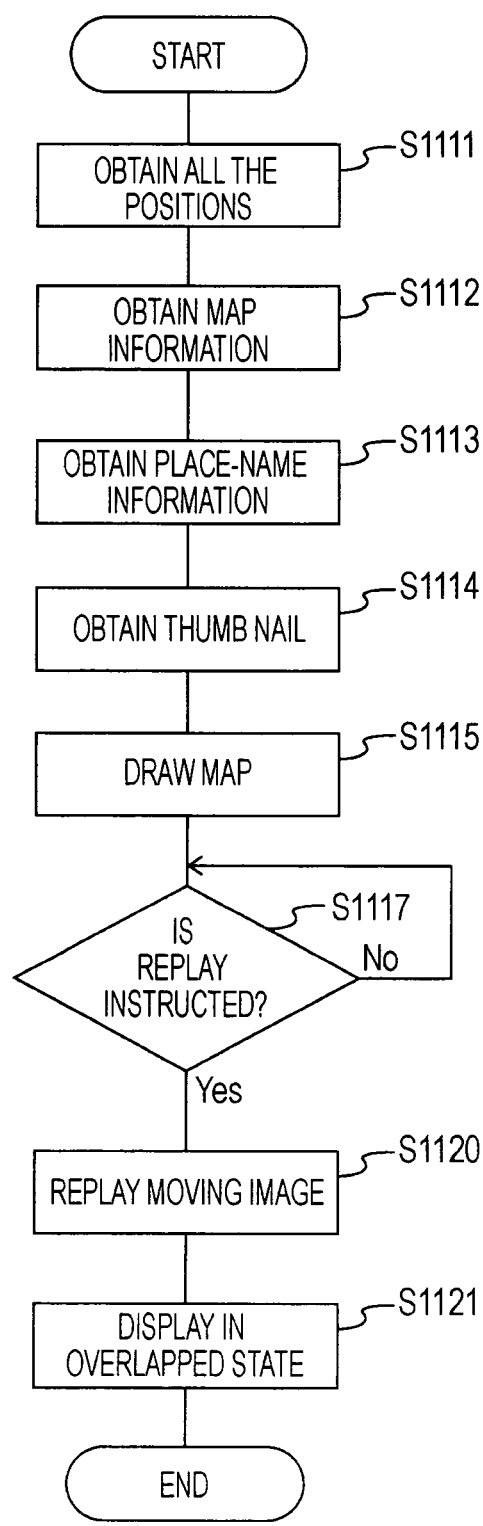
FIG. 17 is a second flowchart showing an example of processing steps until the moving image is replayed in the embodiment of the present invention.

FIG. 17 is a second flowchart showing an example of processing steps until a moving image is displayed in the embodiment of the present invention. When a moving image file is designated, the position of point of change information 531 of the metadata 530 of the moving image file is read out by the position information obtaining portion 1120, and all the position information of the moving image file is obtained (step S1111).

Map information that covers all the positions included in the obtained position information is obtained by the map information obtaining portion 952 (step S1112) as well as the place-name information of the respective positions is obtained by the place-name information obtaining portion 351 (step S1113). Further, thumbnails corresponding to the respective positions are obtained by the thumbnail obtaining portion 930 (step S1114). Then, a map to be displayed on the map display screen 1091 is drawn by the map drawing portion 960 based on the obtained position information, map information, place-name information, and thumbnails (step S1115).

Thereafter, when a replay instruction of the moving image is received by the operation receiving portion 1010 (step S917), the moving image, the replay portion 910 begins to replay the moving image (step S1120). The replay/display screen 1095 of the replayed moving image is overlapped on the map display screen 1091 by the overlapping portion 980 and displayed on the display portion 990 (step S1121). At the time, the overlapping portion 980 overlaps the replay/display screen 1095 on the map display screen 1091 at the center of a position corresponding to the moving image being replayed.

As described above, according to the embodiment of the present invention, when the position information obtained by the replay position information obtaining portion 320 shows a different position as a replay proceeds, a position when a moving image is replayed can be clearly shown by lighting or flashing a mark at a corresponding position on a map.

Further, according to the embodiment of the present invention, since the thumbnails obtained by the thumbnail obtaining portion are displayed at the corresponding positions on the map, when the user instructs to select any of the thumbnails, a moving image corresponding to the thumbnail is displayed on the replay/display screen, thereby an intuitively understandable user interface can be provided.

Note that the processing steps explained in the embodiment of the present invention may be understood as a method having a series of the steps and further may be understood as a program for causing a computer to carry out the series of the steps or a recording medium for storing the program.

The invention claimed is:

1. A moving image replay device, comprising: a moving image replaying portion configured to replay moving image data; a position information obtaining portion configured to obtain position information accompanying the moving image data; a map information obtaining portion configured to obtain map information that covers a plurality of positions associated with the moving image data in a time sequence included in the position information; and a display configured to display a map on which the plurality of positions are marked based on the map information and the position information, wherein the display is configured to display an attribute as to the reliability of the position information applied to the marks corresponding to the plurality of positions, wherein the attribute as to the reliability of the position information applied to the marks corresponding to the plurality of positions corresponds to a value of Dilution of Precision (DOP) of positioning carried out by position measurement using Global Positioning System (GPS).

2. The moving image replay device according to claim 1, wherein the moving image data is one moving image file.

3. The moving image replay device according to claim 1, wherein the plurality of positions are positions for showing a change of the position information when an image is picked up.

4. The moving image replay device according to claim 1, further comprising:
a map information database configured to store map information in correspondence to the position information,
wherein the map information obtaining portion obtains the map information that covers a plurality of positions included in the position information by searching the map information database.

5. The moving image replay device according to claim 1, further comprising:
a place-name information obtaining portion configured to obtain place-name information corresponding to the position information,
wherein the display is configured to display the place-names included in the place-name information appended to the marks corresponding to the plurality of positions.

6. The moving image replay device according to claim 1, wherein the display is configured to display a special effect applied to the marks corresponding to the moving image data being replayed by the moving image replay portion among the marks corresponding to the plurality of positions.

7. A moving image replay device according to claim 1, wherein the display is configured to time sequentially show a picked-up order to the marks corresponding to the plurality of positions.

8. The moving image replay device according to claim 1, further comprising:
a replay position information obtaining portion configured to obtain position information corresponding to a replay time of the moving image data replayed by the moving image replay portion as replay position information;
a previous replay position information holding portion configured to hold position information before the replay time as previous replay position information; and
a replay position information comparing portion configured to compare the replay position information with the previous replay position information and disagreement therebetween,
wherein when the disagreement is detected, the display is configured to display a special effect applied to the marks corresponding to the replay position information among the marks of the plurality of positions, and
when the disagreement is detected, the previous replay position information holding portion holds the replay position information as new previous replay position information.

9. The moving image replay device according to claim 8, further comprising:
a display update timer configured to measure an obtaining interval at which the replay position information is obtained,
wherein, each time the display update timer measures the obtaining interval, the replay position information obtaining portion obtains the replay position information.

10. A moving image replay method, comprising: obtaining position information accompanying moving image data; obtaining map information covering a plurality of positions associated with the moving image data in a time sequence included in the position information; displaying a map, on which the plurality of positions are marked, based on the map information and the position information; and displaying an attribute as to the reliability of the position information applied to the marks corresponding to the plurality of positions, wherein the attribute as to the reliability of the position information applied to the marks corresponding to the plurality of positions corresponds to a value of Dilution of Precision (DOP) of positioning carried out by position measurement using Global Positioning System (GPS).

11. A non-transitory computer-readable medium including computer program instructions, which when executed by a computer, cause the computer to perform a method comprising: obtaining position information accompanying moving image data; obtaining map information covering a plurality of positions associated with the moving image data in a time sequence included in the position information; displaying a map, on which the plurality of positions are marked, based on the map information and the position information; and displaying an attribute as to the reliability of the position information applied to the marks corresponding to the plurality of positions, wherein the attribute as to the reliability of the position information applied to the marks corresponding to the plurality of positions corresponds to a value of Dilution of Precision (DOP) of positioning carried out by position measurement using Global Positioning System (GPS).

12. A moving image replay device, comprising: a position information obtaining portion configured to obtain position information accompanying with moving image data; a map information obtaining portion configured to obtain map information covering a plurality of positions associated with the moving image data in a time sequence included in the position information; a typical image obtaining portion configured to obtain a plurality of typical images corresponding to the plurality of positions, respectively; and a display configured to display a map, on which the plurality of positions and typical images corresponding to them are shown, based on the map information and the position information, wherein the display is configured to display an attribute as to the reliability of the position information corresponding to the plurality of positions, wherein the attribute as to the reliability of the position information applied to the marks corresponding to the plurality of positions corresponds to a value of Dilution of Precision (DOP) of positioning carried out by position measurement using Global Positioning System (GPS).

13. The moving image replay device according to claim 12, wherein the moving image data is one moving image file.

14. The moving image replay device according to claim 12, wherein the plurality of positions are positions for showing a change of position information when an image is picked up.

15. The moving image replay device according to claim 12, further comprising:
an operation receiving portion configured to receive an operation instruction for selecting the plurality of typical images; and
a moving image replay portion configured to replay moving image data corresponding to a typical image, to which an operation instruction for selection is received by the operation receiving portion, among the plurality of typical images and outputting the moving image data.

16. A moving image replay method, comprising: obtaining position information accompanying with moving image data; obtaining map information covering a plurality of positions associated with the moving image data in a time sequence included in the position information; obtaining a plurality of typical images corresponding to the plurality of positions, respectively; displaying a map, on which the plurality of positions and typical images corresponding to them are shown, based on the map information and the position information; and displaying an attribute as to the reliability of the position information applied to the plurality of positions, wherein the attribute as to the reliability of the position information applied to the marks corresponding to the plurality of positions corresponds to a value of Dilution of Precision (DOP) of positioning carried out by position measurement using Global Positioning System (GPS).

17. A non-transitory computer-readable medium including a computer program, which when executed by a computer, causes the computer to perform a method comprising: obtaining position information accompanying with moving image data; obtaining map information covering a plurality of positions associated with the moving image data in a time sequence included in the position information; obtaining a plurality of typical images corresponding to the plurality of positions, respectively; displaying a map, on which the plurality of positions and typical images corresponding to them are shown, based on the map information and the position information; and displaying an attribute as to the reliability of the position information applied to the plurality of positions, wherein the attribute as to the reliability of the position information applied to the marks corresponding to the plurality of positions corresponds to a value of Dilution of Precision (DOP) of positioning carried out by position measurement using Global Positioning System (GPS).

18. The moving image replay device according to claim 1, the attribute as to the reliability of the position information applied to the marks corresponding to the plurality of positions includes changing a color of the marks corresponding to the plurality of positions based on the reliability of the position information.

* * * * *

UNITED STATES PATENT AND TRADEMARK OFFICE
CERTIFICATE OF CORRECTION

Page 1 of 1

PATENT NO. : 8,625,956 B2
APPLICATION NO. : 11/794738
DATED : January 7, 2014
INVENTOR(S) : Baiping Liao et al.

It is certified that error appears in the above-identified patent and that said Letters Patent is hereby corrected as shown below:

On the title page, Item (86), the PCT Information is incorrect. Item (86) should read:

--(86)  PCT No.:       PCT/JP2006/322179

§ 371 (c)(1),
(2), (4) Date:   Jul. 5, 2007--

Signed and Sealed this
Fifteenth Day of April, 2014

Michelle K. Lee
*Deputy Director of the United States Patent and Trademark Office*